(12) United States Patent
Min

(10) Patent No.: US 6,657,838 B2
(45) Date of Patent: Dec. 2, 2003

(54) LCD BACKLIGHT INVERTER

(75) Inventor: Byoung Own Min, Suwon-shi (KR)

(73) Assignee: Samsung Electro-Mechanics Co., Ltd., Suwon-shi (KR)

( * ) Notice: Subject to any disclaimer, the term of this patent is extended or adjusted under 35 U.S.C. 154(b) by 162 days.

(21) Appl. No.: 09/849,285

(22) Filed: May 4, 2001

(65) Prior Publication Data

US 2002/0060893 A1 May 23, 2002

(30) Foreign Application Priority Data

Nov. 22, 2000 (KR) ........................................ 2000-69418

(51) Int. Cl.⁷ ................................................ H02H 3/20
(52) U.S. Cl. ........................ 361/91.1; 361/86; 361/88; 323/276; 315/119
(58) Field of Search ........................... 361/91.1, 88, 86; 323/276; 315/119

(56) References Cited

U.S. PATENT DOCUMENTS 4,346,342 A * 8/1982 Carollo ...................... 323/276
6,359,391 B1 * 3/2002 Li .............................. 315/291

* cited by examiner

Primary Examiner—Gregory J. Toatley, Jr.
Assistant Examiner—Isabel Rodriguez
(74) Attorney, Agent, or Firm—Ladas & Parry

(57) ABSTRACT

An LCD backlight inverter has a buck switch for determining power supply to a DC/AC converter for converting voltage, the buck switch being connected between a supply voltage input terminal and the DC/AC converter. An overvoltage protection circuit is connected to an input terminal of said DC/AC converter for dividing voltage while providing a current path at the time of the initial drive. A first comparing block compares the dimension of a feedback signal with the dimension of a first reference voltage, the feedback signal representing the voltage according to an on/off status of the backlight. A second comparing block compares the dimension of the voltage divided in the overvoltage protection circuit with the dimension of a second reference voltage. A switching controlling block receives comparison signals from the first and second comparing blocks for controlling an on/off status of the buck switch according to the comparison signals.

4 Claims, 2 Drawing Sheets

LCD BACKLIGHT INVERTER

BACKGROUND OF THE INVENTION

1. Field of the Invention

The present invention relates to a LCD backlight inverter, in particular, which comprises an overvoltage protection circuit for controlling the overvoltage with a stable output in respect to the fluctuation of an input voltage and preventing an effect to a feedback controlling block in opening a lamp used as a backlight.

2. Description of the Prior Art

In general, an overvoltage protection circuit of a LCD backlight inverter of the prior art is constructed as shown in FIG. 1, in which the reference number 10 designates a DC/AC converter for converting voltage in the circuit and a buck switch Q3 is connected between a supply voltage $V_{in}$ and the DC/AC converter 10 to determine power supply. Here, the buck switch Q3 is on/off controlled via an output signal of a switching controlling block 20, in which an overvoltage protection block 30 divides the voltage inputted into the DC/AC converter 10 by using a number of resistances and a result of dividing voltage is inputted into a detection signal judging block 40.

Here, the detection signal judging block 40 has a noninversion terminal (designated by +) connected with a reference voltage $V_1$, and an inversion terminal (designated by −) where the result of dividing voltage in the overvoltage protection block 30 is inputted together with a feedback signal F/B. In other words, the switch controlling block 20 on/off controls the buck switch Q3 according to a result of comparing in the detection signal judging block 40.

In the overvoltage protection circuit of the LCD backlight inverter of the prior art shown in FIG. 1, when a load connected to the rear end or a lamp used as a LCD backlight is opened, a voltage applied to the overvoltage protection block 30 or a point a is elevated so that an output side voltage of the DC/AC converter is elevated to form an overvoltage.

In order to control this problem, a feedback control is performed so that the voltage is divided via voltage detecting resistances designated as the reference numerals R1 and R2 and the result of dividing voltage in the overvoltage protection block 30 is inputted into the inversion terminal of the detection signal judging block 40.

However, in the foregoing methods of the prior art, there have been problems that the voltage fluidly changes according to the change of the supply voltage in the control of the output side overvoltage state of the DC/AC converter 10 and a feedback F/B stage in the rear end is used together in normally operating the lamp in the rear end so that the F/B stage may be influenced according to a voltage at a point a. Therefore, it is difficult to manufacture or design the F/B stage.

SUMMARY OF THE INVENTION

The present invention is proposed to solve the foregoing problems of the prior art and it is therefore an object of the invention to provide an overvoltage protection circuit of a LCD backlight inverter, in particular, which comprises an overvoltage protection circuit for controlling an overvoltage with a stable output in respect to the fluctuation of an input voltage and interrupting an effect to a feedback controlling block in opening a lamp used as a backlight.

According to a preferred embodiment of the invention to obtain the foregoing object, it is provided a LCD backlight inverter comprising: a buck switch for determining power supply to a DC/AC converter for converting voltage, the buck switch being connected between a supply voltage input terminal and the DC/AC converter; an overvoltage protection circuit connected to an input terminal of the DC/AC converter for dividing voltage while providing a current path at the time of the initial drive; a first comparing block for comparing the dimension of a feedback signal with the dimension of a first reference voltage, wherein the feedback signal detects the dimension of the voltage according to on/off status of the backlight lamp in the rear end; a second comparing block for comparing the dimension of the voltage divided in the overvoltage protection circuit with the dimension of a second reference voltage; and a switching controlling block for receiving output signals from the first and second comparing blocks and controlling on/off status of the buck switch according to corresponding comparison signals.

According to an additional feature of the invention to obtain the foregoing object, the first comparing block includes: a first error amplifier having an inversion data input terminal for receiving the feedback signal, wherein the feedback signal detects the dimension of the voltage according to on/off status of the backlight lamp, and a noninversion data input terminal for receiving a first reference signal, to compare the feedback signal and the first reference signal; and a first condenser connected between the output terminal and the inversion data input of the first error amplifier.

According to another additional feature of the invention to obtain the foregoing object, the second comparing block includes: a comparator having an inversion data input terminal for receiving a voltage divided from the overvoltage protection circuit, and a noninversion data input terminal for receiving a second reference signal, to compare the divided voltage and the second reference signal; and a second condenser connected between the output terminal and the noninversion data input terminal of the comparator.

According to further additional feature of the invention to obtain the foregoing object, the second comparing unit includes: a second error amplifier having an inversion data input terminal for receiving a voltage divided from the overvoltage protection circuit, and a noninversion data input terminal for receiving the second reference signal, to compare the divided voltage ad the second reference signal; a third condenser connected between the output terminal and the inversion data input terminal of the second error amplifier; and a diode having a cathode terminal connected to the output terminal of the second error amplifier and an anode terminal connected to the output terminal of the first comparing block.

DETAILED DESCRIPTION

The foregoing object and various advantages of the present invention will be more apparent to those skilled in the art from the following description about preferred embodiments of the invention in reference to the appended drawings.

Hereinafter, preferred embodiments of the invention will be described in detail in reference to the appended drawings.

Figure 1:
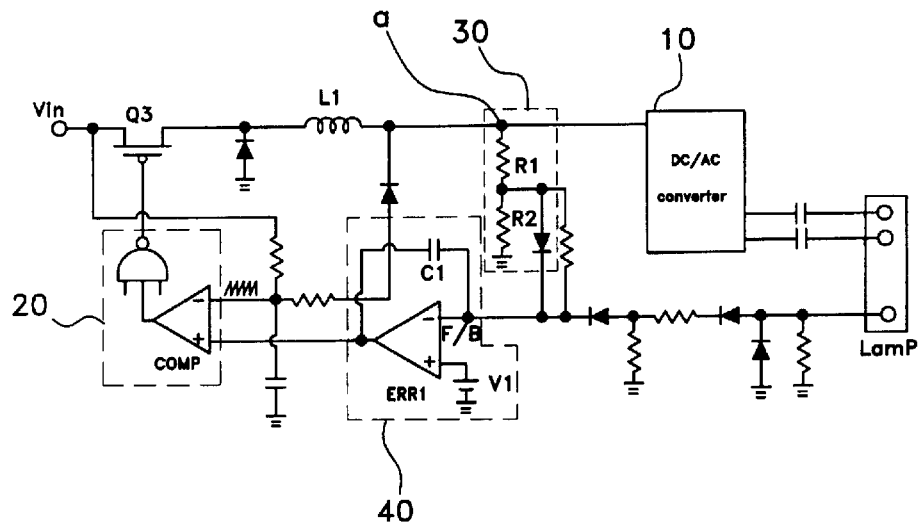
FIG. 1 shows the construction of an overvoltage protection circuit according to the prior art.
Figure 2:
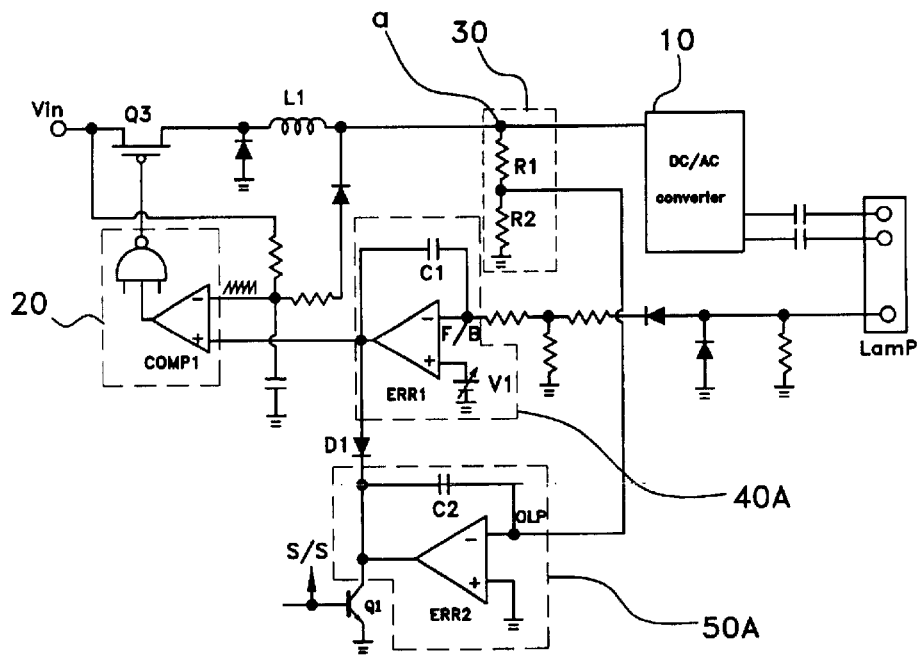
FIG. 2 shows the construction of an overvoltage protection circuit according to the invention.

FIG. 2 shows the construction of an overvoltage protection circuit according to the invention.

In the overvoltage protection circuit shown in FIG. 2, the reference numeral 10 shows a DC/AC converter for converting voltage in the circuit, and a buck switch Q3 is connected between a supply voltage $V_{in}$ and the DC/AC converter 10 to determine the power supply. The buck switch Q3 is on/off controlled via an output signal of a switching controlling block 20.

Here, an overvoltage protection block 30 divides the voltage inputted into the DC/AC converter 10 by using a number of resistances and the divided DC/AC converter input voltage is inputted into a comparing block 50, in which a noninversion terminal + of the voltage comparing block 50 is connected with a random reference voltage and an inversion terminal − is inputted with a result of dividing voltage in the overvoltage protection block 30.

On the other hand, the dimension of a voltage applied to a lamp in the rear end or a feedback signal F/B is applied to an inversion terminal of a detection signal judging block 40A as in a conventional construction.

Here, an output signal of the detection signal judging block 40A and an output signal of the voltage comparing block 50 share one point, the voltage applied to a corresponding contact point is inputted into the switching controlling block 20, and the switching controlling block 20 on/off controls the buck switch Q3 corresponding to the dimension of the inputted voltage.

Therefore, when the lamp in the rear end is opened, the feedback signal F/B for detecting and reporting the dimension of the voltage applied to the lamp is in a low state as a ground voltage, and on the contrary, the voltage applied to the contact a of the overvoltage protecting block 30 increases gradually.

The overvoltage is generated at the output side of the DC/AC converter 10 due to the increase of the voltage applied to the contact a of the overvoltage protection block 30, therefore it is required to prevent the generation of an overvoltage over a predetermined threshold voltage since.

Here, resistances R1 and R2 forming the overvoltage protecting block 30 divide the voltage applied to the contact a and input a divided voltage to the voltage comparing block 50. As a random reference voltage is connected to the noninversion terminal and the result of dividing voltage in the overvoltage protection block 30 is inputted to the inversion terminal, the comparing block 50 outputs a low status signal when the voltage at the contact a is elevated over the reference voltage.

Therefore, the switching controlling block 20 operates the buck switch Q3 off according to the signal from the voltage comparing block 50 to lower the voltage applied to the contact a.

Figure 3:
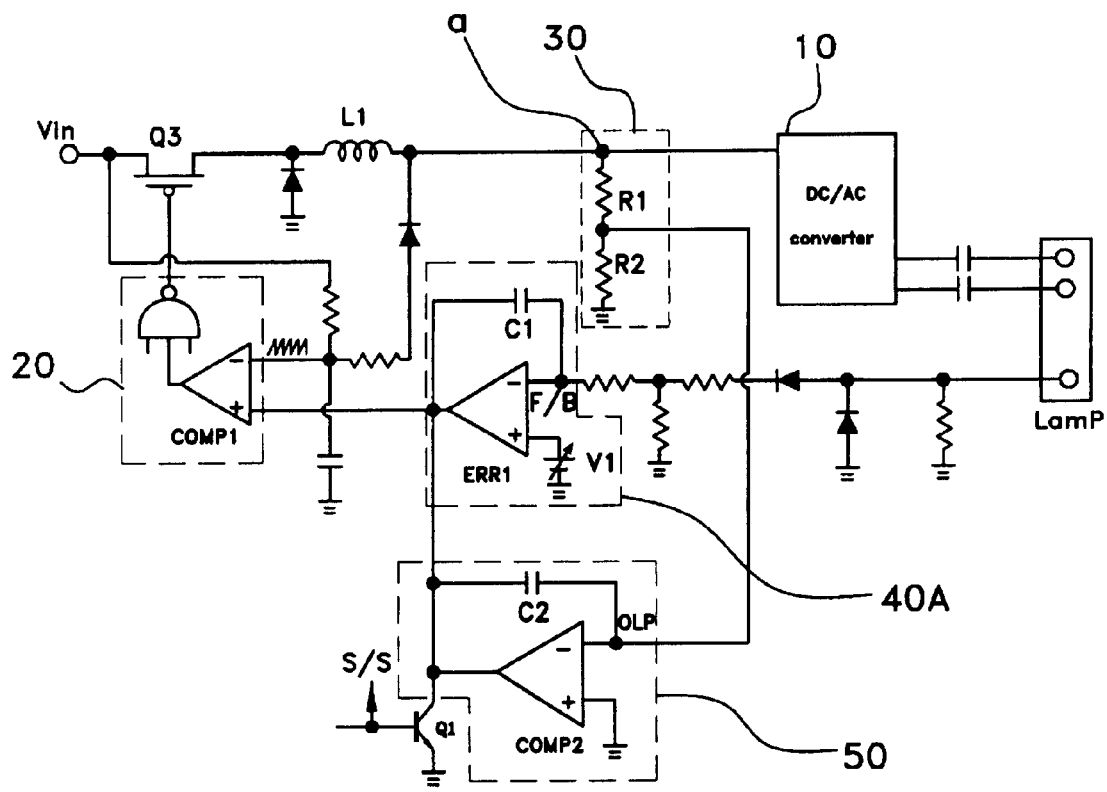
FIG. 3 shows the construction of another overvoltage protection circuit according to the invention.

Another embodiment of the invention having a construction different from that of the foregoing circuit is shown in FIG. 3, in which an overvoltage protection circuit according to the invention shown in FIG. 3 is different form the circuit shown in FIG. 2 where an OP-AMP (which is designated by COMP in FIG. 3) composing the voltage comparing block 50 designated by the reference numeral 50A is used as an error amplifier designated by ERR in FIG. 2.

Therefore, a diode D1 is installed between the output terminal of the detection signal judging block 40A and the output terminal of the voltage comparing block 50 to prevent a counter electrolmotive force.

The diode D1 has an anode terminal connected to the output terminal of and a cathode terminal connected to the output end of the voltage comparing block 50.

It is constructed as above since the error amplifier designated by the reference number ERR has a feature of coordinating sensitively to a voltage change of the output terminal.

The overvoltage protection circuit of the LCD backlight inverter according to the invention is provided as described hereinbefore so that the output voltage can be constantly controlled at any time according to the change of the input voltage by using means for controlling the overvoltage in opening the lamp, and also an effect about an abnormal noise of the feedback signal can be minimized in the normally operating status.

While the present invention has been shown and described in respect about a specific embodiment, it will be apparent to those skilled in the art that a number of modifications and variations can be made without departing the spirit and scope of the invention that is defined by claims.

What is claimed is:

1. In an LCD backlight inverter having a buck switch for determining power supply to a DC/AC converter for converting voltage, said buck switch being connected between a supply voltage input terminal and said DC/AC converter, the improvements comprising:

an overvoltage protection circuit connected to an input terminal of said DC/AC converter for dividing voltage while providing a current path at the time of initial drive;

a first comparing block for comparing the dimension of a feedback signal with the dimension of a first reference voltage, the feedback signal representing the dimension of the voltage according to an on/off status of the backlight in the rear end;

a second comparing block for comparing the dimension of the voltage divided in said overvoltage protection circuit with the dimension of a second reference voltage; and a switching controlling block for receiving comparison signals from said first and second comparing blocks and controlling an on/off status of said buck switch according to the comparison signals.

2. A LCD backlight inverter according to claim 1, wherein said first comparing block includes:

a first error amplifier having an inversion data input terminal for receiving the feedback signal, wherein the feedback signal detects the dimension of the voltage according to on/off status of the backlight lamp, and a noninversion data input terminal for receiving a first reference signal, to compare the feedback signal and the first reference signal; and a first condenser connected between the output terminal and the inversion data input of said first error amplifier.

3. A LCD backlight inverter according to claim 1, wherein said second comparing block includes:

a comparator having an inversion data input terminal for receiving a voltage divided from said overvoltage protection circuit, and a noninversion data input terminal for receiving a second reference signal, to compare the divided voltage and the second reference signal; and a second condenser connected between the output terminal and the noninversion data input terminal of said comparator.

4. A LCD backlight inverter according to claim 1, wherein said second comparing unit includes:

a second error amplifier having an inversion data input terminal for receiving a voltage divided from the overvoltage protection circuit, and a noninversion data input terminal for receiving the second reference signal, to compare the divided voltage ad the second reference signal;

a third condenser connected between the output terminal and the inversion data input terminal of said second error amplifier; and a diode having a cathode terminal connected to the output terminal of said second error amplifier and an anode terminal connected to the output terminal of said first comparing block.

* * * * *